(12) United States Patent
Belton et al.

(10) Patent No.: US 11,939,167 B2
(45) Date of Patent: Mar. 26, 2024

(54) VIBRATORY APPARATUS WITH ELECTRO-MECHANICAL SENSOR

(71) Applicant: General Kinematics Corporation, Crystal Lake, IL (US)

(72) Inventors: Ben Belton, Crystal Lake, IL (US); Oscar L. Mathis, Jr., Cary, IL (US); Steve Massman, Poplar Grove, IL (US); Toby Imes, Crystal Lake, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 141 days.

(21) Appl. No.: 17/662,911

(22) Filed: May 11, 2022

(65) Prior Publication Data
US 2022/0363485 A1 Nov. 17, 2022

Related U.S. Application Data

(60) Provisional application No. 63/189,242, filed on May 17, 2021.

(51) Int. Cl.
*B65G 27/16* (2006.01)
*B06B 1/16* (2006.01)
(Continued)

(52) U.S. Cl.
CPC .............. *B65G 27/20* (2013.01); *B06B 1/16* (2013.01); *B65G 43/08* (2013.01);
(Continued)

(58) Field of Classification Search
CPC ........ B65G 27/16; B65G 27/20; B65G 43/08; G01P 5/02; B06B 1/16
(Continued)

(56) References Cited

U.S. PATENT DOCUMENTS 4,462,508 A * 7/1984 Grafius .............. B65G 47/1421
221/160
5,584,375 A * 12/1996 Burgess, Jr. ............ B06B 1/166
74/61

(Continued)

FOREIGN PATENT DOCUMENTS

DE 3234258 3/1984
DE 102020100805 7/2020

OTHER PUBLICATIONS

International Search Report and Written Opinion, counterpart International App. No. PCT/US2022/028790 (dated Sep. 5, 2022) (11 pages).

*Primary Examiner* — Douglas A Hess
(74) *Attorney, Agent, or Firm* — Cook Alex Ltd.

(57) ABSTRACT

A vibratory apparatus includes a deck, an electro-mechanical sensor and at least one vibratory exciter. The deck has an upper surface configured to receive items to be conveyed in at least a first direction along a longitudinal axis from a first deck end to a second deck end. The electro-mechanical sensor includes a wheel disposed above the upper surface of the deck, the wheel being rotatable about a wheel axis disposed transverse to the longitudinal axis, and an electronic sensor associated with the wheel, the electronic sensor configured to generate a signal representative of the revolutions per unit time of the wheel. The at least one vibratory exciter is attached to the deck and is configured to move the material along the deck.

15 Claims, 5 Drawing Sheets

(51) Int. Cl.
*B65G 27/20* (2006.01)
*B65G 43/08* (2006.01)
*G01P 5/02* (2006.01)

(52) U.S. Cl.
CPC .... *B65G 2201/04* (2013.01); *B65G 2203/025* (2013.01); *B65G 2203/042* (2013.01); *B65G 2812/0304* (2013.01); *G01P 5/02* (2013.01)

(58) Field of Classification Search
USPC .................................. 198/752.1, 759, 761
See application file for complete search history.

(56) References Cited

U.S. PATENT DOCUMENTS

| | | | | |
|---|---|---|---|---|
| 6,216,850 B1 * | 4/2001 | Svejkovksy | ........... | B65G 47/19 198/771 |
| 6,435,337 B1 * | 8/2002 | Sahlberg | ............... | B65G 25/04 74/26 |
| 7,182,200 B2 * | 2/2007 | Narukawa | ............... | B65G 27/24 198/762 |
| 7,323,643 B2 * | 1/2008 | Hjalmarsson | .......... | B65G 25/02 177/121 |
| 7,757,836 B2 * | 7/2010 | Karpinsky | ............... | A23P 20/12 198/758 |
| 7,775,343 B2 * | 8/2010 | Kemph | ..................... | A61J 3/07 198/754 |
| 8,464,861 B2 * | 6/2013 | Bonn | ..................... | B65G 27/08 198/758 |
| 9,587,999 B2 | 3/2017 | Miyajima et al. | | |
| 10,071,865 B2 * | 9/2018 | Maggioni | ............... | B65G 27/04 |
| 10,815,064 B1 * | 10/2020 | Ahmed | ................. | B65G 27/04 |
| 10,974,907 B2 * | 4/2021 | Olmstead | ............... | B65G 27/12 |
| 11,358,801 B2 * | 6/2022 | Svejkovsky | ........... | B65G 27/16 |
| 11,511,430 B2 * | 11/2022 | Hirakawa | ............... | B25J 9/1674 |
| 2007/0193858 A1 * | 8/2007 | Hillstrom et al. | | |
| 2020/0238522 A1 | 7/2020 | Hirakawa et al. | | |

\* cited by examiner

VIBRATORY APPARATUS WITH ELECTRO-MECHANICAL SENSOR

CROSS-REFERENCE TO RELATED APPLICATIONS

This patent claims the benefit of U.S. Provisional Patent App. No. 63/189,242, filed May 17, 2021, which is expressly incorporated herein by reference in its entirety.

BACKGROUND

This patent is directed to a vibratory apparatus with an electro-mechanical sensor, and, in particular, to a vibratory apparatus with a multi-purpose electro-mechanical sensor.

Vibratory apparatuses, such as conveyors or feeders, have a deck along which material may be moved. In general terms, the apparatus may be designed to move the material from one end of the deck to the other, or even to move the material from either end to the other. Depending on the construction of the apparatus, the precise mechanism for movement of the material along the deck may vary.

The material moving along the deck may spread across a width of the deck, as well as moving along a length of the deck. Some vibratory apparatuses move material along the deck in discrete batches, while other vibratory apparatus move material along the deck in a continuous (or substantially continuous) bed. In the latter case, it is also possible for the material on the deck to achieve a certain height above the deck, which may be referred to as a bed depth.

It has been suggested to use electronic or opto-electronic devices to measure certain characteristics of the material moving along the deck. For example, it has been suggested that a camera may be used to generate images of the material moving along the apparatus. From these images, it has been further suggested that it may be possible to measure the speed of the material moving along the deck. It also has been suggested that it may be possible to determine the spread of the material across the width of the deck, as well as bed depth where that is an issue, from the images. Alternatively, it has been suggested that one might use a wave-based sensing system, such as radar, to take measurements of the speed of the material or the depth of the bed.

Use of electronic or opto-electronic devices with vibratory apparatuses is not without its limitations. For example, the nature of the motion of the material along the deck and across the deck may make use of such sensing technologies less reliable than desired, or even unreliable. The operating conditions of the apparatus may also pose challenges for the use of electronic or opto-electronic sensing systems, in particular where the material may be moving slowly along the deck and may be capable of wide variation as to its composition (e.g., steel beams vs. automotive scrap vs. fine material) over time. Further, the environment in which vibratory apparatus is used may be hostile to the sensing technologies (e.g., extreme high temperatures, corrosive conditions, very dusty atmosphere), and/or may add to the unreliability of the measurements obtained (e.g., obscure the line of sight of the sensor).

It thus would be advantageous to overcome or substantially ameliorate one or more of the disadvantages of such existing sensors as they are used with vibratory apparatuses, or at least to provide a useful alternative.

SUMMARY

A vibratory apparatus includes a deck, an electro-mechanical sensor and at least one vibratory exciter. The deck has an upper surface configured to receive items to be conveyed in at least a first direction along a longitudinal axis from a first deck end to a second deck end. The electro-mechanical sensor includes a wheel disposed above the upper surface of the deck, the wheel being rotatable about a wheel axis disposed transverse to the longitudinal axis, and an electronic sensor associated with the wheel, the electronic sensor configured to generate a signal representative of the revolutions per unit time of the wheel. The at least one vibratory exciter is attached to the deck and is configured to move the material along the deck.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF VARIOUS EMBODIMENTS

Figure 1:
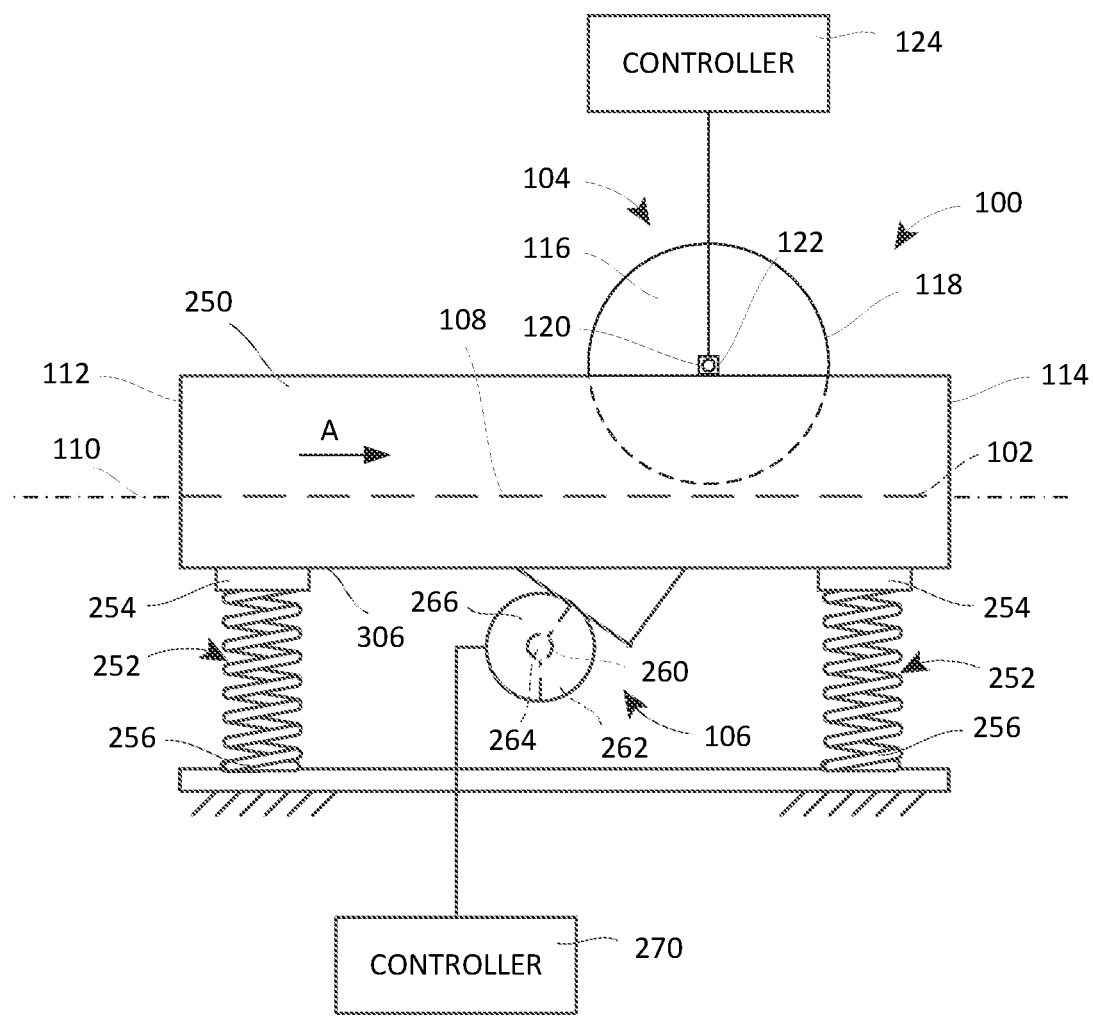
FIG. 1 is a schematic view of a vibratory apparatus incorporating an electro-mechanical sensor.

According to an embodiment of the present disclosure and as illustrated in FIG. 1, a vibratory apparatus 100 includes a deck 102, an electro-mechanical sensor 104, and at least one vibratory exciter 106 attached to the deck 102. The deck 102 has an upper surface 108 configured to receive items to be conveyed in at least a first direction (arrow A) along a longitudinal axis 110 from a first deck end 112 to a second deck end 114.

Figure 2:
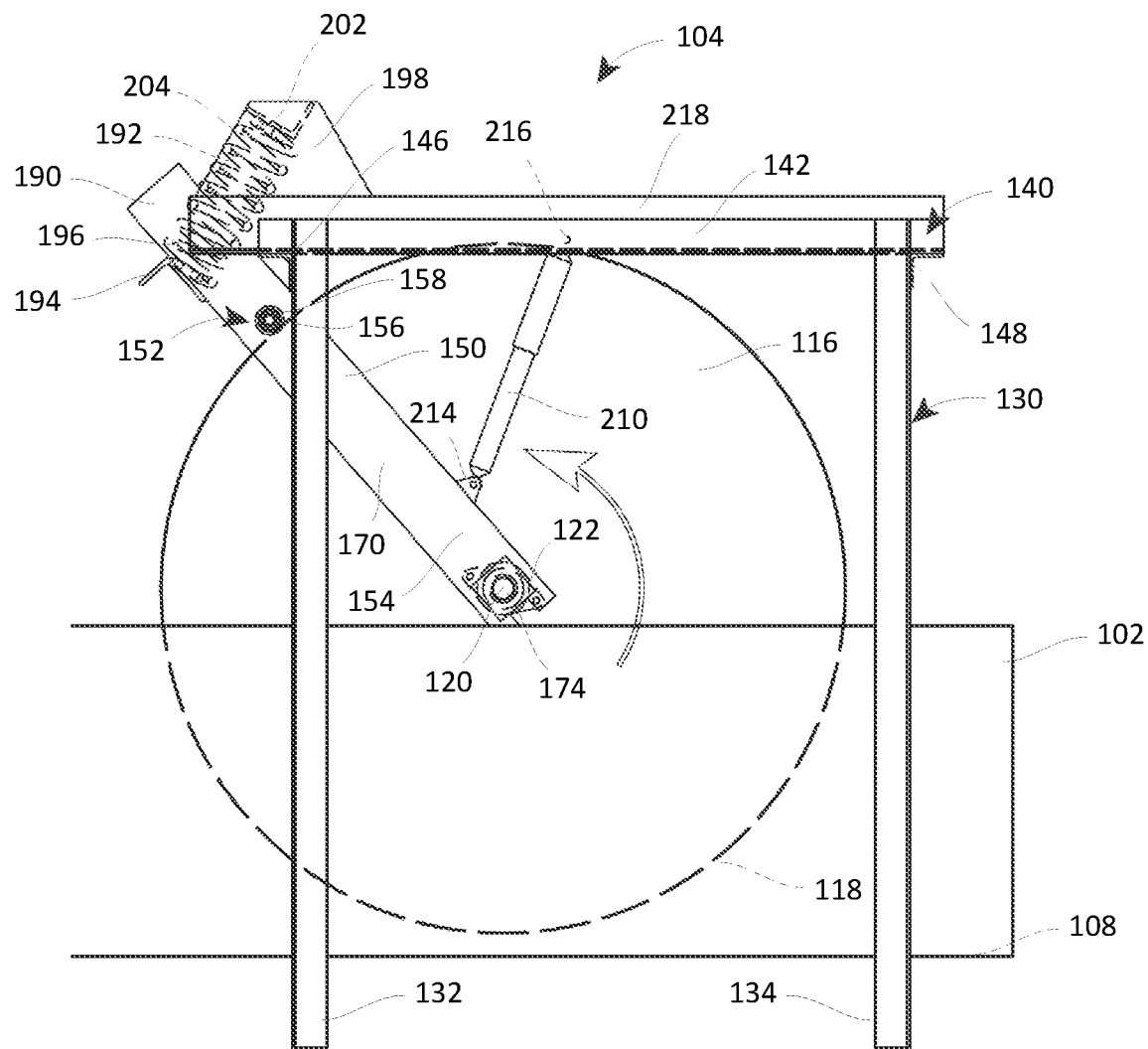
FIG. 2 is a side view of an electro-mechanical sensor for use with a vibratory apparatus, as in FIG. 1.
Figure 3:
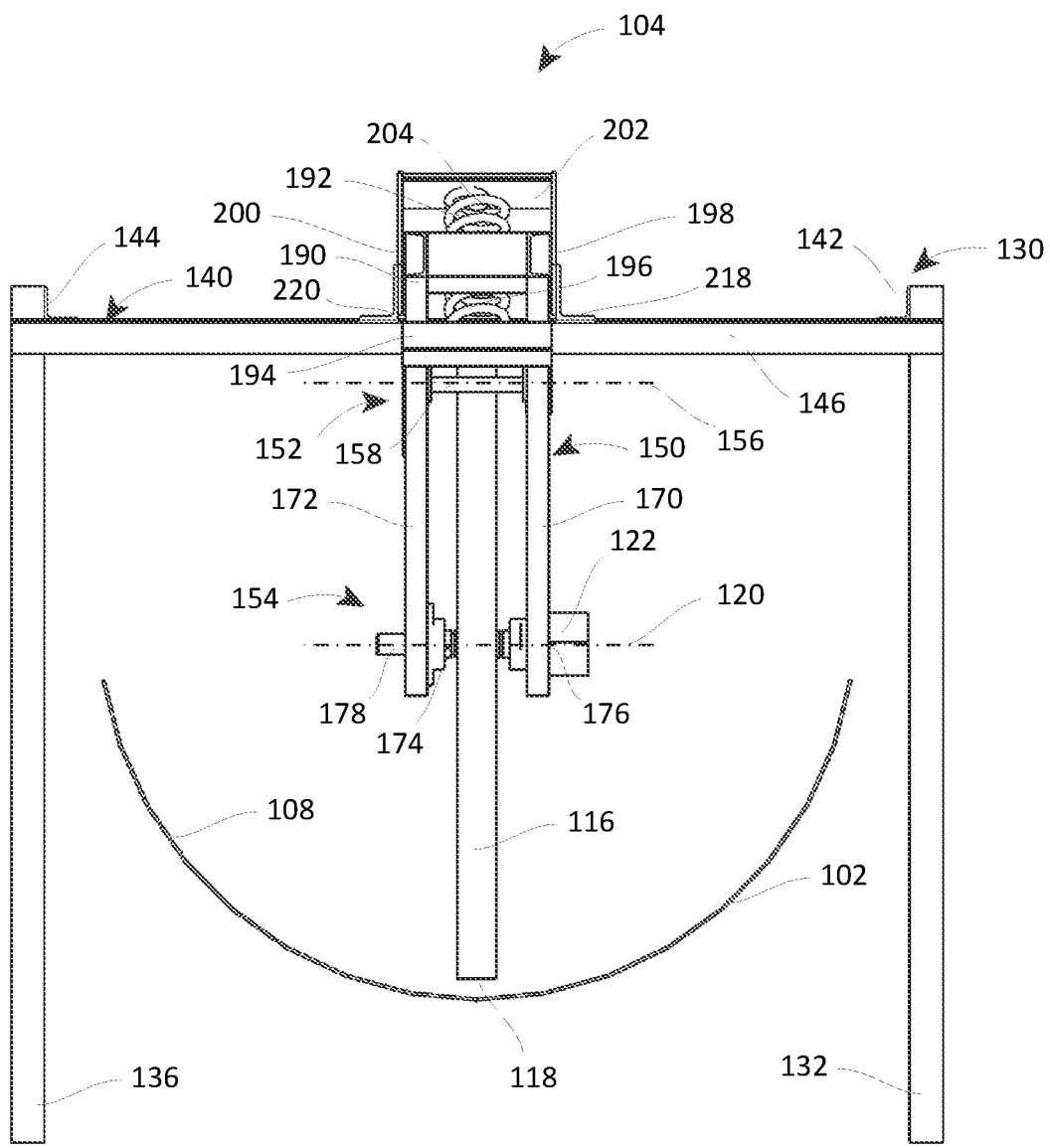
FIG. 3 is a rear end view of the electro-mechanical sensor of FIG. 2.
Figure 4:
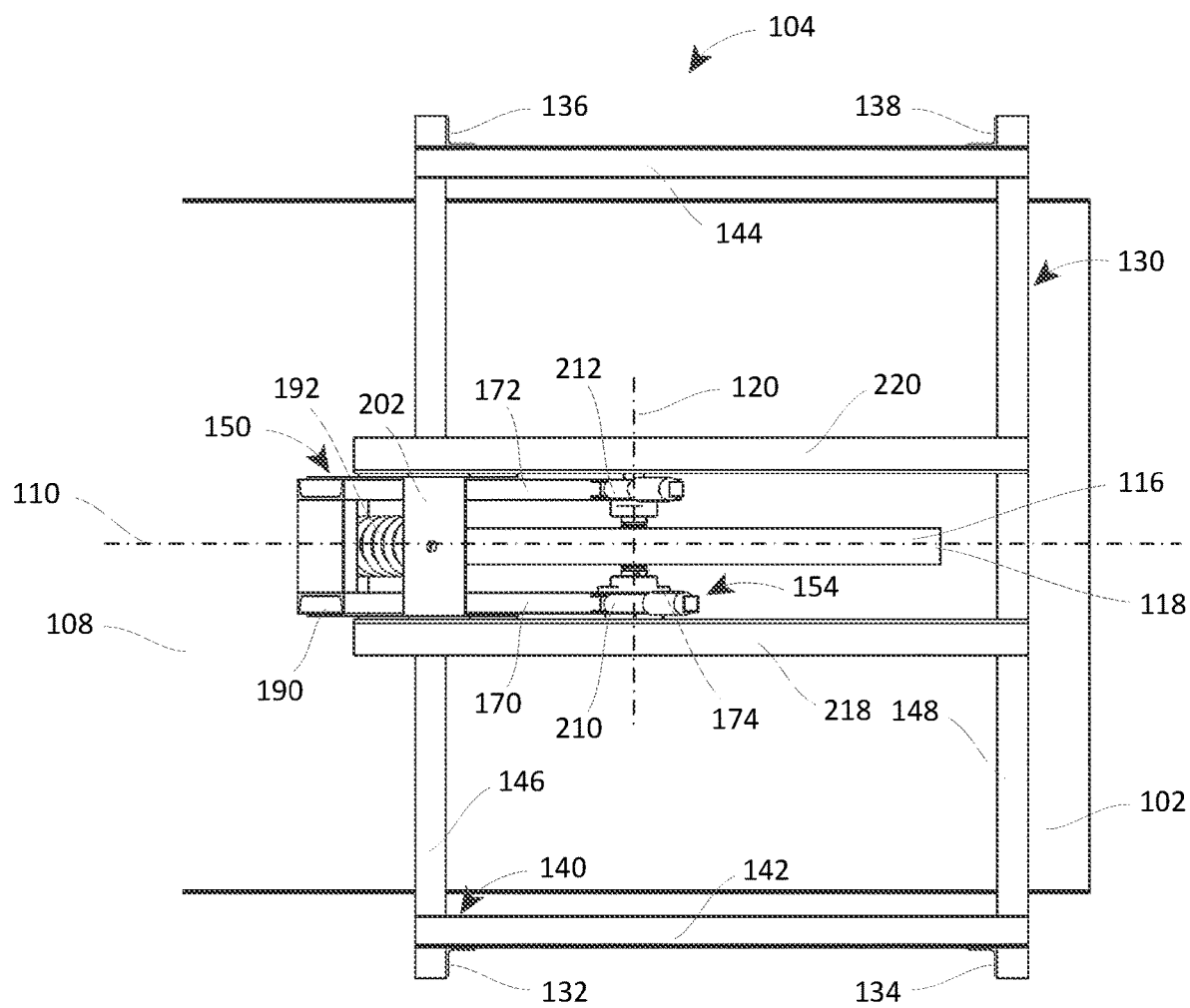
FIG. 4 is a plan view of the electro-mechanical sensor of FIG. 2.

The electro-mechanical sensor 104 includes a wheel 116 disposed above the upper surface 108 of the deck 102. In particular, an edge 118 of the wheel 116 may be disposed above and spaced from the surface 108 of the deck 102. The wheel 116 is rotatable about a wheel axis 120 disposed transverse to the longitudinal axis 110. The axis 120 extends out of the page as illustrated in FIGS. 1 and 2, and is more easily viewed in FIGS. 3 and 4.

The sensor 104 also includes an electronic sensor 122 associated with the wheel 116. The electronic sensor 122 is configured to generate a signal representative of the revolutions per unit time of the wheel 116. For example, the sensor 122 may be a rotary encoder, such as an incremental rotary encoder.

In operation, the revolutions of the wheel 116 per unit time and the diameter of the wheel 116 may be combined to determine the speed of material moving along the deck 102. That is, the material contacts the edge 118 of the wheel 116 as the material moves along the deck 102 between the first and second ends 112, 114. Knowing the diameter of the wheel 116 and the number of revolutions that occur within a unit time, the speed of the material may be determined by the following equation:

$$S = \pi D \times R \qquad \text{(eqn. 1)}$$

where:

S is the speed;

D is the diameter of the wheel 116; and

R is the number of revolutions of the wheel 116 per unit time.

The electronic sensor 122 may be coupled (e.g., connected directly or indirectly (i.e. with intervening components or equipment), via hardwire or wirelessly) to a controller 124 that may be configured to perform the calculation. For example, where the controller 124 includes a processor and associated memory, instructions may be stored on the memory that when performed on the processor cause the processor to calculate the speed based on the signal received from the sensor 122.

In regard to the controller 124 and the other controllers described herein, it also will be recognized that the processor may be a microprocessor (which, in fact may include multiple physical and/or virtual processors). According to other embodiments, the controller may include one or more electrical circuits designed to carry out the actions described herein. In fact, the controller may include a microprocessor and other circuits or circuitry. In addition, the controller may include one or more memories, as mentioned above. The instructions by which the microprocessor is programmed may be stored on the one or more memories associated with the microprocessor, which memory/memories may include one or more tangible non-transitory computer readable memories, having computer executable instructions stored thereon, which when executed by the microprocessor, may cause the microprocessor to carry out one or more actions as described herein.

The electro-mechanical sensor according to the present disclosure may have one or more advantages. Initially, the sensor uses a robust mechanical device, the wheel, which mechanical device can be designed to operate in complex and hostile environments. Further, because the wheel comes in direct contact with the material moving along the deck, concerns relating to the environment interfering with the sensor may be reduced relative to those technologies that rely on line of sight or electromagnetic waves. In addition, unlike electronic or opto-electronic technologies where the electronics must be able to adapt to changes in the material configuration and composition, the electronic sensor used in the sensor 104 has a more well-defined and limited role in determining the number of revolutions of the wheel. All of this leads to a more robust, less complex sensor than competing electronic or opto-electronic technologies for determining the speed of material moving along the deck.

Having thus described the general structure and operation of the apparatus 100 and the electro-mechanical sensor 104 incorporated therein, further details of the embodiments of the apparatus 100 and the sensor 104 may be discussed. Initially, the structure of the sensor 104 is discussed with references to FIGS. 2-5, after which the apparatus 100 is described in greater detail with reference to FIG. 1.

As illustrated in FIGS. 2-5, the wheel 116 has a relatively narrow dimension (width) in a direction transverse to the longitudinal axis 110 of the deck 102. It will be recognized that this is simply one embodiment of the wheel 116, and that other embodiments may be far wider than the illustrated embodiment. For example, it is presently believed that a wider wheel may be useful to mitigate jamming of the wheel 116 in the material moving along the deck 102 where the material is metal scrap of various sizes and shapes. It is also presently believed that a wider wheel may be advantageous in mitigating settlement of the wheel in a more granular solid bed. As such, the illustrated embodiment is exemplary, not limiting.

Other embodiments may also feature surface characteristics selected according to the intended operational and environmental conditions, as well as the composition of the material moving along the deck 102. For example, a rubber, polymer, or roughened steel surface along the edge 118 may be used to provide sufficient friction to maintain accurate wheel surface speed. Furthermore, while the wheel 116 appears to be a single, unitary structure, it is possible to have an embodiment of the wheel 116 wherein the wheel 116 has a removeable outer region, like a tire, that permits for rapid replacement of the section of the wheel 116 that comes directly in contact with the material moving along the deck 102.

Other variations in the wheel 116 are possible, relative to the wheel 116 illustrated in FIGS. 2-5, to address environmental or operational conditions, or the composition of the material moving along the deck 102. For example, the wheel 116 may be designed to limit the weight of the wheel 116. This may be helpful in limiting or preventing the wheel 116 from burying itself in the bed, instead of riding along the top of the material bed. In such a case, the wheel 116 may be made of a lightweight material, such as aluminum.

It is believed that the diameter of the wheel 116 should be selected such that the diameter or radius of the wheel is much larger than the depth of the material bed moving along the deck 102. It is believed that in this way the entanglement with material moving along the deck 102 may be mitigated, either limited or eliminated.

As illustrated in FIGS. 2-5, the embodiment of the electro-mechanical sensor 104 includes a frame 130. As illustrated, the frame 130 is attached to ground separately from the deck 102. The frame 130, may include four legs 132, 134, 136, 138 that extend from a platform 140 defined by a series of cross members 142, 144, 146, 148. While the legs 132, 134, 136, 138, and the cross members 142, 144, 146, 148 are each made of angle iron in the illustrated embodiment, the frame 130 is not limited to such a structure.

Attached to the frame 130 is an arm 150. The arm 150 is attached at a pivot 152 to the frame 130 and the wheel 116 is rotatably attached at a first end 154 of the arm 150. The wheel 116 thus is rotatable at the first end 154 of the arm 150 about the wheel axis 120, and the arm 150 is pivotable relative to the frame 130 at the pivot 152 about a pivot axis 156. As illustrated, the pivot 152 is disposed closer to the first deck end 112 than the first end 154 of the arm 150, which may permit the arm 150 to move easily pivot as material moves past the wheel 116 in direction A. It is also believed that this attachment permits the wheel 116 to accommodate various bed depths while providing accurate speed data.

Figure 5:
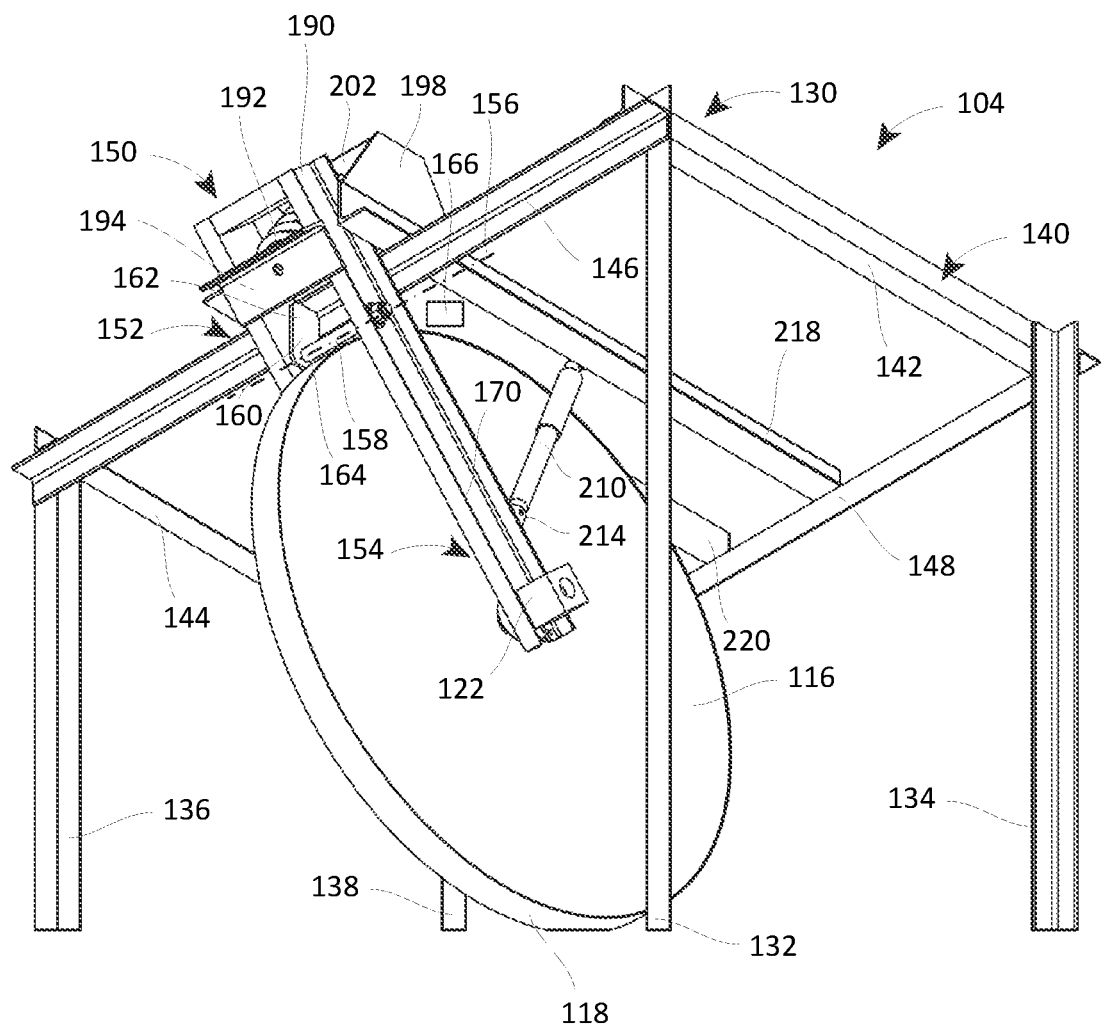
FIG. 5 is a partial, enlarged perspective view of the electro-mechanical sensor of FIG. 2.

The pivot 152 may be attached to the frame 130 in a variety of ways. In the illustrated embodiment, and as best seen in FIG. 5, the pivot 152 is defined by an axle 158 that is disposed between two brackets 160, one of which may be seen in FIG. 5. The mounting brackets 160 have a first end 162 that is attached to the frame 130 (in particular cross member 146) and a second end 164 with an aperture formed therein to receive one of the ends of the axle 158.

The pivoting attachment of the wheel 116 to the frame 130 also permits the movement of the arm 150 to be used to determine the depth of the material moving along the deck 102, and in particular the deck surface 108. To this end, an electronic sensor 166 may be associated with the arm 150, which sensor 166 is configured to generate a signal representative of an angular position of the arm 150. See FIG. 5. For example, the sensor 166 may be an electronic inclinometer or an angle encoder.

The dimensions of the wheel 116 and the arm 150, as well as the spacing of the edge 118 of the wheel 116 from the surface 108 and the geometry of the pivot 152 relative to the surface 108 may be used to define an equation that relates the angular motion of the arm 150 into the distance between the edge 118 of the wheel 116 and the surface 108 of the deck 102. As was the case for sensor 122, the sensor 166 may be coupled (e.g., connected directly or indirectly (i.e. with intervening components or equipment) to a controller (e.g., the controller 124) that may be configured to perform the calculation. For example, where the controller includes a processor and associated memory, instructions may be stored on the memory that when performed on the processor cause the processor to calculate the depth based on the signal received from the sensor 166.

The arm 150, or at least the first end 154 of the arm 150, includes first and second blades 170, 172. As illustrated in FIGS. 2-5, the entire arm 150 includes first and second blades 170, 172. The wheel 116 is disposed between the first and second blades 170, 172, and the wheel 116 includes an axle 174 that is mounted at a first end 176 to the first blade 170 and a second end 178 to the second blade 172. For example, bearings may be provided at the first end 176 and the second end 178 to permit the axle 174 to rotate about the wheel axis 120.

The arm 150 also has a second end 190, with the pivot 152 disposed between the first and second ends 154, 190 of the arm 150 along a length of the arm 150. As illustrated, the second end 190 of the arm 150 may also include the blades 170, 172.

A resilient member 192 is disposed between the second end 190 of the arm 150 and the frame 130, which resilient member may resist movement of the wheel 116 away from the material moving along the surface 108 of the deck 102. The resilient member 192 also may be included to reduce the weight of the assembly of the wheel 116 and the arm 150 acting on the bed surface. In particular, the blades 170, 172 of the arm 150 may have a mount 194 attached between the blades 170, 172, which mount 194 is attached to a first end 196 of the resilient member 192. A pair of brackets 198, 200 with a cross member mount 202 may be attached to the platform 140 of the frame 130, and a second end 204 of the resilient member 192 may be attached to the mount 202. The resilient member 192 may be a coil spring, for example, as is illustrated in FIGS. 2-5.

The sensor 104 may also include one or more dampers (or shock absorbers) 210, 212 to smooth the motion of the wheel 116 over the material moving along the deck 102. According such an embodiment, the arm 150 has at least one damper 210, 212 attached at a first end 214 to the arm 150 between the pivot 152 and the first end 154 of the arm 150 along the length of the arm 150 and at a second end 216 to the frame 130. As illustrated, one or more supports 218, 220 may be attached to the platform 140 between the cross-members 146, 148, and the second ends 216 of the dampers 210, 212 may be attached to the supports 218, 220.

As mentioned above, a controller 124 may be provided, the controller coupled to the electronic sensor 122 associated with the wheel 116, and configured to determine a speed of the material conveyed in the at least first direction along the deck 102 based on the signal from the electronic sensor 122 associated with the wheel 116. In addition, a controller 124 may be provided that is coupled to the electronic sensor 166 associated with the arm 150, and is configured to determine a depth of the material conveyed along the deck 102 based on the signal from the electronic sensor 166 associated with the arm 150. In certain embodiments, the controller 124 coupled to the sensor 166 may also be coupled to the electronic sensor 122 associated with the wheel 116, and may be configured to determine a speed of the material conveyed in the at least first direction along the deck 102 based on the signal from the electronic sensor 122 associated with the wheel 116.

According to certain embodiments, the controller or controllers coupled to the sensors 122, 166 may be part of the apparatus 100. Alternatively, one or both of the controllers may be separate from the apparatus 100, although the controller coupled to the sensor(s) 122, 166 may itself be coupled to a controller that is provided with the apparatus 100.

Having thus described the sensor 104 with reference to FIGS. 2-5, other aspects of the apparatus 100 are now described with reference primarily to FIG. 1. It will be appreciated that the description of the further details of the apparatus 100 of FIG. 1 is done by way of illustration, not limitation.

As illustrated in FIG. 1, the deck 102 is part of a trough 250 that is attached to the exciter 106. The trough 250 may include additional structures that support the deck 102. The deck 102 may have a curved shape, such as is illustrated in FIGS. 2-5, or the deck 102 may have a more flat or planar shape. The surface 108 of the deck 102 may be solid and free of surface textures, or the deck 102 may have raised surface textures, apertures through the deck 102, or any combination thereof.

As illustrated, the trough 250 is supported by a plurality of resilient members 252, which resilient members 252 may also be referred to as isolation springs. As illustrated, the resilient members 252 may be in the form of coil springs, but other springs may be used instead. The resilient members 252 are attached at a first end 254 to the trough 250 and at a second end 256 to ground or a base disposed on ground. In this fashion, the deck 102 may be coupled to ground via attachment to the trough 250, which is in turn attached to the resilient members 252.

It will be recognized that the trough 250 of the apparatus 100 may be supported on the ground by a number of different structures, which structures may include additional platforms with the trough 250 attached to the intermediate platform by one of more rocker arms or links and/or one or more resilient members (such as springs) and the platform may be supported on a base by rocker arms/links and/or resilient members. As such, the illustration of FIG. 1 is merely exemplary.

The at least one vibratory exciter 106 has at least one exciter shaft 260 with an eccentric mass 262 attached thereto, the shaft 260 having a shaft axis 264 of rotation (out of the plane of the page in FIG. 1) about which the mass 262 is rotated. As illustrated, the at least one vibratory exciter 106 includes at least one motor 266 having a motor shaft, the at least one exciter shaft 260 being the motor shaft. As an alternatively, the exciter 106 may have a shaft with attached mass(es) that is driven by a motor that is disposed adjacent to, but not mounted on, the apparatus 100. As illustrated, the shaft axis 264 is transverse to the longitudinal axis 110 of the deck 102.

As illustrated, the exciter 106 is attached fixedly to the trough 250 in a brute force arrangement. It will be recognized that one or more resilient members (which may be referred to as reactor springs, and may be coil springs for example) may be disposed between the shaft 260 (e.g., between a platform on which the shaft 260 or the motor 266, where the motor shaft defines the shaft 260, is mounted) and the trough 250. Such an arrangement may be referred to as a two-mass arrangement, and may also be used with an apparatus 100 according to the present disclosure. Further, the illustrated rotary centrifugal force generator may be replaced by a rotating eccentric shaft connected to the trough 250 through resilient members.

Further, a controller 270 may be coupled to the motor 266, as is illustrated in FIG. 1. The controller 270 may be coupled (e.g., connected directly or indirectly (i.e. with intervening components or equipment) to the exciter 106 to control the operation of the apparatus 100. For example, where the controller includes a processor and associated memory, instructions may be stored on the memory that when performed on the processor cause the processor to control the operation of the exciter 106 (e.g., the motor 266) to control the operation of the apparatus 100. While the controller 270 has been illustrated as separate from the controller 124 coupled to the sensor 122, and potentially the sensor 166, the controller 270 may be coupled to the sensors 122, 166 and be configured (e.g., programmed) to determine the speed and bed depth of material moving along the deck 102, which speed and bed depth may be used to control the operation of the exciter 106.

As one example for the use of a vibratory apparatus 100 with a sensor 104, such an apparatus may be used in the apparatus and system described in U.S. application Ser. No. 17/308,630, which application is incorporated by reference in its entirety herein. As described, the system includes at least one apparatus that utilizes at least one motion sensor to determine a material mass flow rate that is used to control the operation of the apparatus. The sensor 104 may be used as the at least one motion sensor described therein. In a general sense, the sensor 104 is believed to be useful in a variety of settings where scrap material, such as steel scrap, is moved along a vibratory apparatus and accurate information regarding the speed of the material is desired.

A vibratory apparatus 100 with a sensor 104 may also be used to determine a volumetric flow rate of material along the deck 102. That is, given the dimensions of the deck 102, along with a bed depth determined by using the sensor 104, the cross-sectional area of the bed may be determined. This information may be combined with the speed of the material moving along the deck, which also may be determined using the sensor 104, to provide a volumetric flow rate of material moving along the deck. This volumetric flow rate may be combined with estimated values for the density of the material moving along the deck 102 to estimate a material mass flow rate along the deck.

In addition, where the apparatus 100 equipped with the sensor 104 provides material to one or more downstream stations, which stations may themselves be conveyors or feeders, the volumetric flow rate may be used to generate an alarm if the apparatus 100 exceeds a particular volumetric flow rate. For example, where it is known that the density of the material moving along the apparatus 100 may vary greatly, the volumetric flow rate may be controlled with a predetermined range to prevent the density variations from exceeding the capacity of the downstream stations. In such a case, the data generated from the sensor 104 may be combined with the information regarding the desired range for volumetric flow to generate an alarm, and thereby prevent the capacity of the downstream stations to be exceeded.

Although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A vibratory apparatus comprising:
    a deck having an upper surface configured to receive items to be conveyed in at least a first direction along a longitudinal axis from a first deck end to a second deck end;
    an electro-mechanical sensor comprising a wheel disposed above the upper surface of the deck, the wheel being rotatable about a wheel axis disposed transverse to the longitudinal axis, and an electronic sensor associated with the wheel, the electronic sensor configured to generate a signal representative of the revolutions per unit time of the wheel; and
    at least one vibratory exciter attached to the deck.

2. The vibratory apparatus according to claim 1, wherein the electro-mechanical sensor comprises a frame and an arm, the arm attached at a pivot to the frame and the wheel rotatably attached at a first end of the arm, the wheel thus being rotatable at the first end of the arm about the wheel axis and the arm pivotable relative to the frame at the pivot.

3. The vibratory apparatus according to claim 2, wherein the pivot is disposed closer to the first deck end than the first end of the arm.

4. The vibratory apparatus according to claim 2, wherein at least the first end of the arm comprises first and second blades, the wheel disposed between the first and second blades and the wheel including an axle that is mounted at a first end to the first blade and a second end to the second blade.

5. The vibratory apparatus according to claim 2, wherein the arm has a second end, the pivot disposed between the first and second ends of the arm along a length of the arm, and the electro-mechanical sensor further comprises a resilient member disposed between the second end of the arm and the frame.

6. The vibratory apparatus according to claim 5, wherein the resilient member is a coil spring.

7. The vibratory apparatus according to claim 2, wherein the arm has at least one damper attached at a first end to the arm between the pivot and the first end of the arm along the length of the arm and at a second end to the frame.

8. The vibratory apparatus according to claim 2, wherein the frame is attached to ground separately from the deck.

9. The vibratory apparatus according to claim 2, wherein the electro-mechanical sensor comprises an electronic sensor associated with the arm, and configured to generate a signal representative of an angular position of the arm.

10. The vibratory apparatus according to claim 9, in combination with a controller, the controller coupled to the electronic sensor associated with the arm, and configured to determine a depth of the material conveyed along the deck based on the signal from the electronic sensor associated with the arm.

11. The vibratory apparatus according to claim 10, wherein the controller is coupled to the electronic sensor associated with the wheel, and is configured to determine a speed of the material conveyed in the at least first direction along the deck based on the signal from the electronic sensor associated with the wheel.

12. The vibratory apparatus according to claim 1, in combination with a controller, the controller coupled to the electronic sensor associated with the wheel, and configured to determine a speed of the material conveyed in the at least first direction along the deck based on the signal from the electronic sensor associated with the wheel.

13. The vibratory apparatus according to claim 1, wherein the at least one vibratory exciter having at least one exciter shaft with an eccentric mass attached thereto, the shaft having a shaft axis of rotation about which the mass is rotated.

14. The vibratory apparatus according to claim 13, wherein the at least one vibratory exciter comprises at least one motor having a motor shaft, the at least one exciter shaft comprising the motor shaft.

15. The vibratory apparatus according to claim 13, wherein the shaft axis is transverse to the longitudinal axis.

* * * * *